United States Patent
Lang et al.

(10) Patent No.: US 11,952,731 B2
(45) Date of Patent: Apr. 9, 2024

(54) METHOD FOR PIVOTING A TRAVEL UNIT OF A ROAD MILLING MACHINE AND ROAD MILLING MACHINE

(71) Applicant: BOMAG GmbH, Boppard (DE)

(72) Inventors: Stephan Lang, Boppard (DE); Moritz Starkmeth, Boppard (DE); Matthias Schaaf, Boppard (DE)

(73) Assignee: BOMAG GmbH, Boppard (DE)

( * ) Notice: Subject to any disclaimer, the term of this patent is extended or adjusted under 35 U.S.C. 154(b) by 185 days.

(21) Appl. No.: 17/573,887

(22) Filed: Jan. 12, 2022

(65) Prior Publication Data

US 2022/0235523 A1 Jul. 28, 2022

(30) Foreign Application Priority Data

Jan. 22, 2021 (DE) .......................... 102021000333.0

(51) Int. Cl.
| | |
|---|---|
| *E01C 23/088* | (2006.01) |
| *B60G 3/01* | (2006.01) |
| *B60G 17/019* | (2006.01) |
| *B60G 17/056* | (2006.01) |
| *B60S 9/12* | (2006.01) |
| *B60S 9/14* | (2006.01) |

(52) U.S. Cl.
CPC .............. *E01C 23/088* (2013.01); *B60G 3/01* (2013.01); *B60G 17/01908* (2013.01); *B60G 17/0565* (2013.01); *B60S 9/12* (2013.01); *B60S 9/14* (2013.01); *B60G 2300/09* (2013.01); *B60G 2400/051* (2013.01)

(58) Field of Classification Search
CPC . E01C 23/088; B60S 9/12; B60S 9/14; B60G 2300/09
See application file for complete search history.

(56) References Cited

U.S. PATENT DOCUMENTS

| | | | | |
|---|---|---|---|---|
| 4,762,371 A | * | 8/1988 | Lupton | .................. E01C 23/088 404/91 |
| 6,705,798 B2 | * | 3/2004 | Dubay | .................. E01C 23/088 180/209 |
| 2018/0094403 A1 | * | 4/2018 | Nobles | ...................... B60S 9/02 |

FOREIGN PATENT DOCUMENTS

| | | |
|---|---|---|
| DE | 102013005594 A1 | 10/2014 |
| DE | 102014014704 A1 | 4/2016 |

OTHER PUBLICATIONS

German Patent Office, Search Report, Application No. 10 2021 000 333.0, dated Nov. 15, 2021 (4 pages).

* cited by examiner

*Primary Examiner* — Janine M Kreck

(74) *Attorney, Agent, or Firm* — Wood Herron & Evans LLP

(57) ABSTRACT

A method for pivoting a travel unit on a machine frame of a road milling machine between an outer end position and an inner end position offset toward a center of the machine relative to the outer end position, the road milling machine having a travel mechanism with multiple travel units, of which at least one travel unit is height-adjustable via a lifting column, comprising the steps of positioning a support foot mounted on the machine frame in a ground contact position to support the machine frame, lifting the travel unit, pivoting the travel unit between the outer end position and the inner end position, lowering the travel unit, and positioning the support foot in a stowed position.

23 Claims, 8 Drawing Sheets

METHOD FOR PIVOTING A TRAVEL UNIT OF A ROAD MILLING MACHINE AND ROAD MILLING MACHINE

CROSS-REFERENCE TO RELATED APPLICATIONS

The present application claims priority under 35 U.S.C. § 119 of German Patent Application No. 10 2021 000 333.0, filed Jan. 22, 2021, the disclosure of which is hereby incorporated herein by reference in its entirety.

FIELD OF THE INVENTION

The present invention relates to a method for pivoting a travel unit on the machine frame of a road milling machine between an outer end position and an inner end position offset toward the center of the machine relative to the outer end position. Moreover, the present invention relates to a road milling machine having such a function.

BACKGROUND OF THE INVENTION

Generic road milling machines are used for removing or roughening road surfaces, for example asphalt surfaces. They typically have a travel mechanism supporting the machine frame with several travel units, which may be, for example, crawler tracks or wheels. At least one of the travel units is height-adjustable via a lifting column. The central work unit of generic road milling machines is a milling drum mounted for rotation about a rotation axis inside a milling drum box. The milling drum box surrounds the milling drum in the shape of a hood and is open at the bottom, i.e., toward the ground. The milling drum typically comprises an essentially hollow-cylindrical support tube having a plurality of milling tools, such as milling chisels, installed on its outer circumferential surface. During operation, the milling chisels are driven into the ground by the rotation of the milling drum, thereby milling the ground. The milling drum box surrounding the milling drum, in turn, prevents the milled material from being thrown around in an uncontrolled manner in order to prevent personal injury, and usually guides the milled material onto a conveyor that transports the milled material away. Spaced transversely to a working direction of the road milling machine, the milling drum box is typically bounded by two lateral shields that rest on the ground adjacent to the milling drum and typically have skids to slide along the ground. Toward the rear, the milling drum box is closed by a stripping device, which is mounted such that it slides/strips over the milling bed and strips off milled material. Moreover, the lateral shields and/or the stripping device are often height-adjustable, for example via hydraulic cylinders. For example, the milling depth can be increased by lowering the milling drum box together with the milling drum while, for example, the lateral shields and/or the stripping device continue to rest on the ground next to/in the milling track and are not lowered any further or are partially raised accordingly relative to the rest of the machine.

In generic road milling machines, the milling drum box and the milling drum are typically arranged laterally offset transversely to a working direction, so that on one machine side, the so-called zero side, the milling drum box and the milling drum end almost flush with the outer contour of the road milling machine, in particular the machine frame. On the zero side, the road milling machine can therefore mill particularly close to obstacles, such as walls, manhole covers or curbs. Small and compact milling machines, in particular, are equipped with a rear rotor. This means that the milling drum is arranged essentially between the travel units at the rear in the working direction and at the level of the rear travel units as seen in the traveling direction. Thus, the rotation axis of the milling drum in extension typically intersects two travel units. One of the travel units is usually arranged in the working direction at the level of the rotation axis of the milling drum and next to it on the zero side so that the machine has as stable a stand as possible during the milling work. To enable the road milling machine to mill as close as possible to obstacles on the zero side, it is necessary to move the travel unit at the rear in the working direction out of its position next to the milling drum box on the zero side. In the prior art, it is already known to configure this travel unit so as to be able to pivot between an outer end position and an inner end position offset toward the center of the machine relative to the outer end position. The outer end position refers to the position assumed by the travel unit next to the milling drum box on the zero side in which the travel unit contributes to maximum stability of the road milling machine. From this position, the travel device can be pivoted via a pivot arm or other pivoting device into a recess of the machine frame located in front of the milling drum box in the working direction, in which it is ideally free of protrusions relative to the zero side of the machine. In this so-called inner end position, the travel unit thus no longer projects laterally, i.e., transversely to the working direction, beyond the outer contour of the road milling machine or the machine frame, so that the road milling machine can essentially mill toward an obstacle up to the zero side of the machine frame. Such a road milling machine is known, for example, from DE 10 2014 014 704 A1 by the same applicant.

The pivotable travel unit is typically pivoted manually. The pivoting process typically comprises lifting the pivotable travel unit so that it is no longer in contact with the ground, followed by the pivoting movement between the inner and outer end positions per se, and finally lowering until the pivotable travel unit is back in contact with the ground. During this pivoting process, the road milling machine therefore stands on one less travel unit than during normal operation, which has a negative effect on the stability of the machine. It may therefore be necessary to lower the road milling machine as a whole before the pivoting process so that, on the one hand, the center of gravity is lower and the road milling machine rests directly on the ground with the milling drum box or the milling drum, for example. This additional support is intended to prevent the machine from tipping over while the travel unit is pivoted. However, it has been shown in everyday use that lowering the machine until it rests with the milling drum box or the milling drum on the ground often results in damage to the milling drum box or the milling drum. In addition, it is often difficult for the operator of the road milling machine to assess during operation whether the lowering of the machine has increased the stability sufficiently to reliably prevent tipping during the pivoting of the travel unit. Especially on sloping ground, it is often difficult to estimate the actual inclination of the machine. In addition, this approach often places considerable weight on comparatively small surfaces, such as the corners and edges of the milling drum box or individual milling tools. This can cause damage to the machine and to the ground, for example to the sealing on bridges. Such damage must then be repaired at great expense.

It is therefore one aspect of the present invention to increase the operational safety of a road milling machine. In particular, tipping of the machine during the pivoting of a travel unit and damage to the machine and the ground should be reliably avoided.

SUMMARY OF THE INVENTION

Specifically, one aspect is achieved with a method for pivoting a travel unit on the machine frame of a road milling machine between an outer end position and an inner end position offset toward the center of the machine relative to the outer end position, the road milling machine having a travel mechanism with multiple travel units, of which at least one travel unit is height-adjustable via a lifting column, with the method comprising the steps of:
  a) positioning a support foot mounted on the machine frame in a ground contact position to support the machine frame,
  b) lifting the travel unit, pivoting the travel unit between the outer end position and the inner end position, lowering the travel unit, and
  c) positioning the support foot in a stowed position.

One aspect of the present invention is to support the road milling machine on the ground via the support foot during the pivoting process of the travel unit. Said supporting via the support foot is intended to replace the missing support by the pivoting travel device during the pivoting process and thus leads to a stable position of the road milling machine on the ground even while the travel unit is pivoted. As will be described below, other parts of the machine, such as parts of the milling drum box or the milling drum itself, may also be considered for supporting the road milling machine or the machine frame on the ground. However, in accordance with one exemplary method described here, a support foot is to be used. For this purpose, the support foot is arranged in the region of the machine in which the pivotable travel unit is also located. If the latter is arranged at the rear right, for example, the support foot may be likewise arranged in the rear right machine region. If the pivotable travel unit is arranged at the rear left, the support foot may be likewise arranged in the rear left machine region. If both rear travel units are pivotable, support feet may accordingly be provided on both sides of the machine. The support foot does not have to be arranged directly where the pivotable travel unit is arranged. For example, the support foot may be arranged in the machine quarter in which the pivotable travel unit is arranged. The support foot is preferably arranged at a maximum distance of 1 m, more preferably at a maximum distance of 50 cm, most preferably at a maximum distance of 30 cm from the outer end position and/or the inner end position of the pivotable travel unit.

The support foot thus provides the machine with an additional resting element, which serves specifically to increase the stability of the machine during the pivoting process of the pivotable travel unit. The support foot is thus also to be understood as supplementary to any travel units for transport and working operation of the work device comprising the milling drum box with lateral shields, stripping device and milling drum. In particular, the support foot thus designates a dedicated resting device whose exclusive function consists in contacting the underlying ground and supporting the machine frame in the pivoting process. A travel function is not provided for the support foot. In one embodiment, the support foot is adjustable between a position in contact with the ground and a position free of contact with the ground. The support foot according to the present invention will be described in more detail below by way of example. Thus, it is important that the support foot is a separate component provided exclusively for the purpose of supporting the road milling machine or its machine frame on the ground. A particular advantage of using a separate support foot is that the latter may be configured such that the ground is not subjected to excessive point forces. Damage to the ground, for example the sealing of a bridge, can therefore be avoided. In addition, since the support foot does not have to perform any other function for the road milling machine, it may be located at an advantageous position on the machine that ensures that the stability is particularly high when the travel unit is pivoted.

Generally, the road milling machine or its machine frame can be supported on the support foot in different ways. On the one hand, the machine frame itself is height-adjustable via the lifting columns of the travel units. The support foot may therefore be fixed to the machine frame in a stationary manner, for example. To support the machine frame on the support foot, the machine frame is moved downward until the support foot is in contact with the ground. Additionally or alternatively, the support foot itself may be height-adjustable relative to the machine frame. In this case, the support foot can be lowered until it contacts the ground. The same also applies to the reverse process when the machine frame is no longer to be supported on the support foot. In other words, positioning to the ground contact position may comprise lowering the machine frame until the support foot is in the ground contact position and/or adjusting a height of the support foot relative to the machine frame from a stowed position to the ground contact position. Additionally or alternatively, positioning in the stowed position may comprise lifting the machine frame until the support foot is in the stowed position and/or adjusting a height of the support foot relative to the machine frame from the ground contact position to the stowed position. The lowering or lifting of the support foot thus respectively comprises a height adjustment of the support foot through a height adjustment of the machine frame and/or a height adjustment of the support foot relative to the machine frame. For the latter case, a drive apparatus may be provided for height adjustment of the support foot, such as a hydraulically or electrically driven actuator. The latter may be controlled by an operator from the operator platform and/or from a side position on the machine, or it may be integrated in an automatic control system.

The ground contact position is the position in which the road milling machine is supported on the ground via the support foot. The support foot is therefore in contact with the ground and transfers part of the weight of the road milling machine to the ground. The stowed position, in turn, describes a position of the support foot in which it is mounted on the machine frame without ground contact. Particularly in the case of a height-adjustable support foot, the stowed position may also describe a positioning of the support foot inside the machine frame such that the support foot does not protrude outward beyond the machine frame. For example, the support foot may be behind a cover in the stowed position. It is also possible for the support foot to be mounted and dismounted manually and to be carried along with the machine in a stowage compartment, for example.

The method described above can be carried out by the operator of the road milling machine, as is common in the prior art. The operator thus controls, initiates, monitors and completes the individual method steps. However, in order to relieve the vehicle operator of the individual steps during working operation and at the same time to ensure that tipping of the machine during pivoting of the travel unit is actually precluded, the method is preferably carried out automatically by a control unit upon request by an operator and additionally comprises the following steps:
 a) determining an actual value of at least one position parameter of the machine frame via a sensor device,
 b) adjusting the at least one position parameter of the machine frame via control of the at least one lifting column until reaching a target range such that the machine frame has a stable position in order to avoid tipping during the pivoting of the travel unit, and
 c) restoring the previously determined actual value of the at least one position parameter of the machine frame via control of the at least one lifting column.

The control unit enables parameters to be used in the method according to the present invention which are not available to the operator of the road milling machine during manual operation and which are, for example, detected by the sensor device. By taking these parameters into account, the stability during the pivoting of the travel unit is improved and tipping of the machine is avoided.

Independently of the above-described embodiment of the method, the above-mentioned aspect is also achieved with a method for pivoting a travel unit on the machine frame of a road milling machine between an outer end position and an inner end position offset toward the center of the machine relative to the outer end position, the road milling machine having a travel mechanism with multiple travel units, of which at least one travel unit is height-adjustable via a lifting column, and the method being carried out automatically by a control unit upon request by an operator, the method comprising the steps of:
 a) determining an actual value of at least one position parameter of the machine frame via a sensor device,
 b) adjusting the at least one position parameter of the machine frame via control of the at least one lifting column until reaching a target range such that the machine frame has a stable position in order to avoid tipping during the pivoting of the travel unit,
 c) pivoting the travel unit between the outer end position and the inner end position, and
 d) restoring the previously determined actual value of the at least one position parameter of the machine frame via control of the at least one lifting column.

This method is also suitable as a modification or for combination with the method already described above. The following discussions therefore also apply to all methods according to the present invention.

A central aspect of the variants of the present invention including a control unit is to use the latter to bring the road milling machine into a spatial position in which it has sufficient stability to prevent the machine from tipping over while the travel unit is pivoted. At the same time, the machine should have the same position before and after pivoting, especially relative to the ground, so that the milling work can be continued without further ado after pivoting. This also avoids steps or other irregularities in the milling bed, which would occur if the machine had a different position relative to the ground than before after pivoting the travel unit. This applies if the milling drum is already engaging the ground at the time the method is initiated, which, however, does not necessarily have to be the case. The machine may thus have any initial position from which a safe pivoting process is achieved by adjusting the lifting columns into the target range of the position parameter. The present invention thus reliably prevents the machine from tipping over based on objective measuring parameters, thereby increasing operational safety. At the same time, the operator of the road milling machine can activate and run through the method according to the present invention with only one control command to the control unit. According to the present invention, a type of sequence control is thus also provided which, on the one hand, does not require a specific initial relative position of the machine frame and, on the other hand, enables a pivoting sequence to be carried out quickly and safely. Regardless of the position or orientation of the road milling machine at the time of the pivot request, the control unit performs all the steps necessary to adjust the position of the machine for safe stability, to carry out the pivoting process and finally to return the machine or the machine frame to its original position, i.e., in particular to its position prior to the pivoting process. Although the operator may still intervene in this entire process, for example for safety reasons as described in more detail below, this is not necessary. The method according to the present invention is therefore carried out by the control unit at the push of a button. The control unit may, for example, be part of an on-board computer of the road milling machine. Generic road milling machines typically already have a central processing unit. This central processing unit or the on-board computer may also comprise or constitute the control unit for the method according to the present invention. The method according to the present invention may be carried out, for example, by the on-board computer using a corresponding software.

In the present context, position parameters are considered to be any information that allows a conclusion to be drawn about the current stability of the road milling machine. They may therefore be, for example, measured values that indicate an inclination of the machine frame of the road milling machine, and/or measured values indicating that the machine frame rests on the ground via the milling drum box and/or the milling drum and/or the support foot. Specific examples will be discussed in more detail below. The actual value of such a position parameter is determined and denotes the value, for example numerical value, of the position parameter at the beginning of the method. This value is used again to restore the initial position at the end of the method and to return the machine to the exact state in which the operator activated the method. The position parameter can be changed by adjusting the lifting columns of the travel mechanism, since the spatial position of the machine frame, in particular with respect to the ground, is adjustable via the lifting columns and the position parameter allows conclusions to be drawn about this position. The target range designates an interval of specific values of the position parameter within which the road milling machine has sufficient stability to safely pivot the travel unit. If the current value of the position parameter is outside the target range, it must be assumed that pivoting of the travel unit involves an increased risk of the machine tipping over. The position of the road milling machine, in particular the machine frame, must therefore be adjusted until the current value of the position parameter is within the target range. The position parameter may be adjusted such that it is as close as possible to the horizontal position of the machine frame as defined below. If the actual value of the position parameter determined at the beginning of the method is already within the target range, no further adjustment is necessary. Nevertheless, the measured value is compared to the target range to ensure operational safety. Furthermore, according to an embodiment described below, the target range assumes, in particular, that the machine is supported on the ground via the milling drum box and/or the milling drum and/or the support foot, so that at least additional measures, which will be described in more detail below, are advantageous. Pivoting the travel unit between the outer end position and the inner end position is basically known in the prior art and is therefore not discussed in more detail here. The process is described, for example, in applicant's DE 10 2014 014 704 A1 already mentioned at the beginning, to which reference is made in this respect.

A possible position parameter is, for example, a transverse and/or longitudinal inclination of the machine frame, with the transverse inclination being a preferred position parameter. In principle, the skilled person has no difficulty in understanding what is meant by a transverse or longitudinal inclination of a road milling machine. In the present context, the reference used is a horizontal plane, i.e., a plane orthogonal to the perpendicular, i.e., the direction of gravitational acceleration. A "horizontal position" of the machine frame refers to a position in which the machine frame has the highest possible stability. The road milling machine is typically configured such that, in this position, some elements of the machine are essentially parallel to the horizontal plane, such as the rotation axis of the milling drum and/or the floor of an operator platform. The horizontal position refers to an inclination of the machine, especially a transverse inclination. In the horizontal position, the road milling machine has a high stability.

According to one aspect of the present invention, the at least one position parameter is thus a transverse and/or longitudinal inclination of the machine frame. This inclination is given as a numerical value in degrees indicating the inclination in the respective direction of the machine frame relative to the horizontal position described above. In this embodiment, the target range is defined, in particular, as a deviation of no more than 15°, preferably no more than 10°, preferably no more than 5°, from the horizontal position. In this range, tipping of the road milling machine during the pivoting process can already be reliably avoided. These values may vary depending on the application and are influenced, for example, by the position of the center of gravity, which in turn is influenced by the height of the lifting columns and the position of the conveyor belt and the machine width, as well as the position of the resting point during pivoting. The values given above represent a good compromise. However, it is preferred that for each application, tests are performed for a specific machine on a tilting plate, and the threshold values can then be defined specifically for this machine and for the resting points of the machine frame used during the pivoting process.

In order to make the transverse and/or longitudinal inclination of the machine frame accessible as a position parameter, the sensor device may comprise at least one inclination sensor, for example for the transverse inclination. The sensor device may comprise at least two inclination sensors, more specifically an inclination sensor for the transverse inclination and an inclination sensor for the longitudinal inclination of the machine frame. In addition, an inclination sensor may also be used, which can pick up both the longitudinal and transverse inclination together. The inclination sensor or sensors may be arranged in the rear region of the machine frame, for example in the rear third of the machine's longitudinal extension. The inclination sensor(s) may be arranged, for example, on the rear axle of the rear travel units. In the rear region of the machine frame, the lifting columns of the travel units located there are typically adjusted more than at the front end of the machine frame. For this reason, the corresponding changes are larger at the rear and therefore easier to detect. The inclination sensor or sensors may pick up the respective inclination of the machine frame at regular intervals or continuously and transmit it to the control unit. The control unit uses the measured values, for example, to determine the actual value at the beginning of the method according to the present invention and to determine its deviation from the target range. In this manner, the control unit can then adjust the position parameter until it is within the target range. The generic road milling machines already comprise a leveling system, in particular to bring the milling drum into a defined position relative to the ground. Such a leveling system already typically comprises at least one inclination sensor, which is preferably also used for the method according to the present invention. Alternatively, there may be one or more additional inclination sensors that are independent of any leveling system that may be present.

In addition or as an alternative to the transverse and/or longitudinal inclination of the machine frame, the extension state of the at least one lifting column and, in particular, of all lifting columns of the travel mechanism may also be used. By using the extension state of the lifting columns, it becomes possible to consider not only the inclination of the machine frame alone, but also the height position of the machine frame relative to the ground. It is therefore preferred that the at least one position parameter is a distance that reflects the extension state of at least one hydraulic cylinder. If the extension state of all height-adjustable lifting columns is known, these values can be used to infer, either directly or indirectly, the spatial position of the machine frame, in particular also the inclination in relation to the horizontal position, and also with respect to the height position in relation to the ground. As long as the road construction machine is standing on sufficiently level ground, the inclination can be inferred from the ratio of the extension states of all height-adjustable lifting columns among each other. In this manner, the transverse and/or longitudinal inclination can also be inferred from the extension states. Moreover, the extension states of the height-adjustable lifting columns can be used to determine the height or distance of the machine frame from the ground. The inclination of the machine frame may be kept constant during lowering and also during subsequent lifting of the machine frame. Since the front travel units are often not height-adjustable, this applies, in particular, to the transverse inclination between the rear travel units. When the machine frame is lowered toward the ground, the center of gravity of the road milling machine is also lower, which increases stability. Therefore, a height position or a distance of the machine frame from the ground may also be defined via the target range. The target range then refers, for example, to the respective extension states of the lifting columns and defines a range in which the center of gravity of the road milling machine is low enough to reliably prevent tipping while the travel unit is pivoted. In this case, for example, the target range may likewise be specified as a distance, for example as a distance by which the extension states of the individual lifting columns are allowed to deviate from an extension state in a stable height position, wherein the stable height position must be determined depending on the design of the particular machine. Generally, the stable height position comprises a center of gravity that is as low as possible or as close to the ground as possible. For example, it is preferred that the target range with respect to the extension state of the lifting columns does not deviate by more than 30 cm, preferably not more than 20 cm, preferably not more than 10 cm and particularly preferably not more than 5 cm from an extension state of the respective lifting column in the stable height position of the machine frame. This also takes into account the relation of the extension states of the lifting columns to each other and, in particular, the relation to the fixed height of non-height-adjustable travel units.

In addition or as an alternative to the extension states of the lifting columns, the extension states of the lateral shields and/or the stripping device of the milling drum box as determined, in particular, using the aforementioned length sensors may also be used. The lateral shields and the stripping device are likewise height-adjustable via hydraulic cylinders. In particular, if the target range of the position parameter, especially with respect to the height position of the machine frame in relation to the ground, is such that the road milling machine is supported on the ground via the milling drum box, and thus via the lateral shield and/or the stripping device, their extension state will change. As the machine frame is lowered, the lateral shields and/or the stripping device at some point hit the ground, which pushes them upward. Ground contact can therefore be detected by the start of a change in the extension state of the lateral shields and/or the stripping device. This may therefore also be used to determine the spatial position of the machine frame with respect to the ground, analogously to the extension state of the lifting columns. Moreover, the ground contact of the support foot may also be detected and used. The ground contact may likewise be detected by a sensor, for example a ground contact sensor or, if the support foot is height-adjustable via a hydraulic cylinder, a hydraulic pressure sensor or a weight sensor. In these cases, detection of the ground contact by the ground contact sensor can first ensure that the subsequent steps of the pivoting process (for example, lifting the pivotable travel unit) can be initiated at all. Such a control method is therefore preferably designed such that the control system first queries for presence of ground contact via the support foot and only then enables the further steps of the pivoting process, for example the lifting of the pivotable travel unit.

In order to detect the extension states of the lifting columns or the lateral shields or the stripping device or the support foot or the hydraulic cylinders provided on these for their height adjustment, the sensor device may comprise at least one length sensor on at least one lateral shield and/or the stripping device and/or the support foot and/or on the at least one lifting column. Suitable length sensors include draw-wire sensors or laser distance meters. In one embodiment, all lifting columns and, in particular, also both lateral shields and, in particular, also the stripping device and/or the support foot are each equipped with such a length sensor. More measurement data provides more detailed information about the spatial position of the machine frame.

However, drawing conclusions about the inclination of the machine frame solely from the extension states of the lifting columns, the lateral shields and the stripping device is only possible if the road milling machine stands on a horizontal plane. In case of an inclined ground, this will result in errors. According to one embodiment, even if the position parameter is a distance, the sensor device may also comprise at least one inclination sensor, the measured values of which can then be used to relate the measured values regarding the extension states to an inclination of the ground. The combined measurement of both the inclination and the extension states results, in particular, detailed information about the actual spatial position of the machine frame.

As described above, according to one embodiment of the present invention, adjusting the at least one position parameter of the machine frame comprises supporting the machine frame on the ground, in particular supporting it on the milling drum box, for example the lateral shields and/or the stripping device, and/or supporting it on the milling drum and/or supporting it on the support foot. In other words, the position of the machine frame with respect to the ground is changed such that the machine frame is brought into contact with the ground via the milling drum box and/or the milling drum and/or the support foot. The ground contact of the milling drum box and/or the milling drum and/or the support foot is used to at least partially compensate for the loss of ground contact of the pivoting travel unit. This is particularly helpful because generic road milling machines often have a swing axle at the front in the working direction, which can contribute to tipping when the lateral stability at the rear axle is reduced due to the lifting of the pivotable travel unit. The additional ground contact increases the stability of the road milling machine and reduces the probability of tipping. The skids of the lateral shields and the lowermost milling tools of the milling drum are typically spaced in vertical direction. In other words, there is an offset in the vertical direction between the ground-proximate end of the lateral shields and the ground-proximate end of the milling drum. It is therefore possible to lower the machine frame of the road milling machine to such an extent that the milling drum box is already in contact with the ground, for example via the lateral shields or the stripping device, but the milling drum is not yet in contact with the ground. Due to the height adjustability of the lateral shields and the stripping device, it is then possible to lower the machine frame even further until the milling drum likewise rests on the ground. Depending on how the target range is selected, in one embodiment of the present invention, the lowering of the machine frame prior to the pivoting of the travel device can be performed only to such an extent that the milling drum box and the milling drum are not yet in contact with the ground. The stability of the road milling machine is increased essentially by lowering the center of gravity. Furthermore, in one embodiment of the present invention, the target range may be selected such that the lowering of the machine frame extends into the range in which the milling drum box is in contact with the ground and the stability is further increased by the support on the milling drum box. In one embodiment of the present invention, the target range is selected such that the machine frame is lowered to such an extent that the milling drum also rests on the ground. The combined support on the milling drum box and on the milling drum, which also involves a maximum lowering of the machine's center of gravity, achieves the greatest possible stability of the road milling machine.

For example, if the support foot is not height-adjustable, its end facing the ground, i.e., the end with which the support foot comes into contact with the ground, may be arranged vertically at the level of the lower ends of the milling drum box, for example the lateral shields and/or the stripping device, as well as the milling drum or its milling tools. Those surfaces with which the respective components can contact the ground are thus formed at a same level or height as the lower end of the support foot. In this manner, the resting surface of the respective components can be combined with that of the support foot, whereby the supported weight is distributed particularly advantageously and damage to the ground can be avoided particularly safely. Alternatively, the end of the support foot facing the ground may also be arranged vertically below the lower ends of the milling drum box and the milling drum. The support foot is therefore arranged closer to the ground than the other components of the road milling machine. In this manner, it is possible to support them on the support foot without the milling drum box and/or the milling drum coming into contact with the ground. Damage to the road milling machine that could possibly occur due to ground contact is avoided in this manner. At the same time, the support foot alone provides sufficient stability. In one embodiment, the road milling machine is therefore supported exclusively on the support foot during the pivoting process, although it naturally remains in contact with the ground via the non-pivotable travel units. This embodiment may be provided if the support foot is fixed to the machine frame in a stationary manner, but it is possible that the support foot is height-adjustable relative to the machine frame.

Another advantage of the method according to the present invention is that the control unit can calculate, for example based on determined information about the extension state of the lifting columns, at which moment the milling drum box or also the milling drum and/or the support foot touch the ground. This may also be detected via the extension state of the lateral shields or the stripping device, which changes when the ground begins to push the lateral shields or the stripping device upward during lowering of the machine frame. In this manner, it is possible for the control unit to place the milling drum box, the support foot and, in particular, the milling drum on the ground in a particularly gentle and careful manner. This alone can prevent damage to the milling drum box and the milling drum caused by the operator manually lowering the machine frame, as it is virtually impossible for the operator to time the exact moment when the milling drum box or the milling drum contacts the ground. Damage to the ground that could be caused by abrupt contact, for example of the support foot, is also avoided.

To further increase stability while the machine frame is supported on the ground, it is preferred that the hydraulic cylinders provided for height adjustment of the lateral shields and/or the stripping device and/or the support foot are locked. In particular, the hydraulic cylinders are at least locked to prevent them from being retracted or shortened. This can be achieved, for example, by using a locking valve that blocks the flow of hydraulic fluid to at least one side of the hydraulic cylinder. This is also regulated by the control unit. For example, the control unit adjusts the at least one position parameter of the machine frame until it is within the target range. In this case, the hydraulic cylinders of the lateral shields and/or the stripping device are not blocked, so that the lateral shields and/or the stripping device can be moved upward at least in sections by contact with the ground until the position parameter is in the target range. The same may also be done with the support foot. Alternatively, as long as the support foot is height-adjustable, it may also be lowered and brought into the ground contact position only when the position parameter is in the target range. Once adjusting is completed, the control unit controls the locking valves, for example, and uses them to block the hydraulic cylinders for height adjustment of the lateral shields and/or the stripping device and/or the support foot. In this manner, the hydraulic cylinders counteract further upward displacement of the lateral shields and/or the stripping device with a locking force that helps support the machine frame on the ground. Only then is the ground contact of the pivotable travel unit released by lifting the travel unit.

When the road milling machine is placed on the milling drum, part of the machine weight rests on the milling tools. These may be damaged by the load. It is therefore not uncommon to slide a soft material, such as wooden boards, under the milling drum before supporting the road milling machine on the milling drum. This is to protect the milling drum and, in particular, the milling tools arranged thereon. However, in view of the fact that padding with the softer material requires a separate work step, it should be left to the operator to decide whether support on the milling drum box is already sufficient or whether the specific situation requires that the road milling machine is actually supported on the milling drum. It is therefore provided in one embodiment that the operator specifies via an input means that the machine frame is to be supported on the ground, for example the lateral shields and/or the stripping device, and/or on the milling drum and/or the support foot. The input means may at the same time be the input means that starts the method according to the present invention via the control unit. In this case, three such input means are provided, one for the method involving support on the milling drum, one for the method involving support on the milling drum box, without support on the milling drum, and another one for support on the support foot. Alternatively, a separate input means may be provided which specifies the sole support on the milling drum box and/or on the support foot or the joint support on the milling drum box and the milling drum, optionally also on the support foot, in which case the method is then started via a further input means.

Generally, the adjusting of the least one position parameter into the target range according to the present invention reliably prevents tipping during the pivoting of the travel unit. However, in order to further increase the operational safety of the road milling machine according to the present invention and, so to speak, to draw in a further safety net, it is possible that the control unit aborts the method and, in particular, the pivoting of the travel unit if, despite everything, a tipping of the machine is imminent or occurs. For this, it is necessary for the control unit to monitor the current value of the at least one position parameter also during the further steps of the method according to the present invention, i.e., in particular during the pivoting of the travel unit between the outer end position and the inner end position. For example, the control unit may determine the current value of the position parameter at regular intervals, for example every second. Continuous monitoring of the current value of the position parameter is also possible. If a deviation of the current value of the position parameter from the target range is detected, the control unit aborts the method. Overall, it is therefore possible that the control unit detects the current value of the at least one position parameter of the machine frame several times, in particular continuously, and that the control unit aborts the pivoting of the travel unit if the control unit detects a value that deviates from the target range by a specified threshold value after pivoting has begun. The threshold value may, for example, be zero, i.e., the method may be aborted immediately if the current value of the position parameter is no longer within the target range. The threshold value may also be, for example, a percentage of the target range, for example with respect to the maximum numerical extension of the target range. If, for example, the target range refers to the extension state of a lifting column, and this extension state of the lifting column must not deviate by more than 10 cm from a desired extension state, for example, according to the target range, a percentage threshold value could refer to these 10 cm. Preferred threshold values are, for example, 30%, preferably 20%, preferably 10%. With a threshold value of 10%, any value relating to the extension state of the lifting column between 0 and 10 cm away from the desired extension state would therefore be within the target range. If the current value of this position parameter then changes to up to 11 cm during the pivoting of the travel unit, this current value is no longer in the target range, but is still below the threshold value. If the current value of the position parameter increases above 11 cm, the threshold value is exceeded and the control unit aborts the method. As an alternative to a percentage threshold value, absolute values may of course also be used as threshold values. Even if, despite all precautions, the machine should tip during the method, countermeasures are initiated immediately and automatically by the control unit.

Especially in cases in which the machine frame is supported on the ground via the lateral shields, the lateral shields can be used in a particularly advantageous manner to detect tipping of the machine. This is indicated, for example, by a change in the extension state, in particular a reduction in the extension state, of the lateral shields. If the machine actually tips, the hydraulic pressure in the locked hydraulic cylinder of the lateral shield on the zero side increases massively, since a much larger part of the machine weight suddenly rests on the lateral shield. It is therefore possible that the control unit detects the extension state of the lateral shields and/or the hydraulic pressure in the hydraulic cylinders of the lateral shields, and that the control unit aborts the pivoting of the travel unit if, after pivoting has begun, the control unit detects a value that deviates from the target range by a specified threshold value. As described above, the target range may also comprise values for the extension state of the lateral shields. If the extension state of the lateral shields, in particular the zero-side lateral shield, now changes to a value outside the target range during the pivoting of the travel unit, the machine is tipping toward the zero side, causing the lateral shield to be pushed upward by the ground. In this case, the control unit aborts the method. As a further supplementary or alternative measured value for detecting tipping, different shortening of the extension states of the lateral shields may also be used. If the control unit detects that the extension state of the zero-side lateral shield is shortening, in particular more than the extension state of the lateral shield on the side opposite the zero side, the machine is tipping and the method is aborted. Finally, additionally or alternatively, the pressure in the hydraulic cylinder of the zero-side lateral shield may also be monitored by the control unit. If the pressure increases sharply and, in particular, abruptly, this indicates that the machine is tipping to the zero side, as the machine weight is shifted from the travel units on the opposite side to the zero-side lateral shield, resulting in a pressure increase in the case of a locked hydraulic cylinder. In this case, the target range thus also includes values for the pressure in the hydraulic cylinder, so that the method is aborted if the pressure increases to a value outside and, in particular, above the target range. Due to their arrangement on the road milling machine, the lateral shields are particularly advantageous for this type of monitoring. Additionally or alternatively, however, the extension state of the stripping device and/or the support foot and/or the hydraulic pressure in the hydraulic cylinders of the stripping device and/or the support foot may also be detected and used to monitor the method. Again, abrupt signal changes may be taken as an indication that the machine is tipping and that it is necessary to abort or take further countermeasures.

In addition to an automatic safety function, the operator should also preferably be able to abort the method according to the present invention at any time. It is therefore preferred that the operator can trigger abortion of the method at any time via an input means, in particular such that the initial state of the machine, for example the actual value of the at least one position parameter, is automatically restored by the control unit. The corresponding input means may be configured as an emergency stop button. However, even greater safety is achieved by configuring the input means as a dead man's device. According to one aspect of the present invention, the control unit performs the method as long as the operator keeps an input means activated and aborts the method if the operator releases the input means before the method is completed. In particular, immediately after the input means is released, any pivoting of the travel unit that may have already begun is reversed and the actual value of the at least one position parameter is automatically restored by the control unit.

The above-mentioned aspect is also achieved with a road milling machine for milling off a ground, with a machine frame supported by travel units, wherein at least one travel unit is height-adjustable via a lifting column and is pivotable between an outer end position and an inner end position offset toward the center of the machine relative to the outer end position, and a milling drum mounted for rotation in a milling drum box, wherein according to the present invention a support foot is provided which is configured to support the machine frame on the ground in a ground contact position during pivoting of the travel unit. All of the above-described features, advantages and effects of the methods according to the present invention also apply mutatis mutandis to the road milling machine according to the present invention and vice versa. Therefore, to avoid repetitions, reference is made to the above description. The road milling machine according to the present invention therefore may likewise comprise, for example, the sensor devices described above, travel units, at least one of the travel units being adjustable between an inner and an outer end position, height-adjustable lateral shields, a stripping device, the support foot already mentioned above, hydraulic cylinders, a control unit and input means. Modifications of the road milling machine according to the present invention and, in particular, of the support foot as mentioned below therefore also apply to the methods already described above.

According to one aspect of the present invention, a support foot is provided on which the road milling machine can be supported during the pivoting process of the travel unit. The support foot is thus configured to support the machine frame on the ground when the machine frame is lowered to a support height. The support height refers to the vertical position of the machine frame at which the support foot is in contact with the ground, i.e., in the ground contact position. The support foot is configured, for example, as a bar, which is arranged, in particular, on the machine frame. As described above, the support foot is a separate component and, in particular, is provided independently of and/or in addition to the milling drum box on the road milling machine.

The support foot may be arranged at the rear of the road milling machine, in particular in the rear third of the machine's longitudinal extent, for example offset off-center toward the machine side on which the pivotable travel unit is arranged. The support foot may be located within the machine contour and therefore does not protrude beyond the zero side of the road milling machine. In road milling machines with four travel units, the support foot is particularly preferably located outside the triangle formed in a horizontal plane by the three non-pivotable travel units of the road milling machine, in particular such that among the three sides of the triangle it is closest to the hypotenuse. In this position, the support foot contributes most to the stability of the road milling machine during the pivoting process. In particular, the support foot in ground contact position together with the non-adjustable travel units spans a resting triangle (in the case of road milling machines with a total of three travel units or four travel units with a pair of travel units mounted via a swing axle, usually the front travel units) or resting quadrangle (in the case of road milling machines with a total of four travel units), the support foot being positioned such that a center of gravity of the road milling machine is arranged within this resting triangle or resting quadrangle. The resting triangle or resting quadrangle lies in a horizontal plane. The corners are formed by the respective travel units, for example the centers of the lifting columns of the respective travel units or the surface centers of their resting surfaces, and the support foot, for example the center or surface center of the support foot. The position of the center of gravity of the road milling machine is likewise projected onto the horizontal plane in which the resting triangle or resting quadrangle is located to determine whether or not the center of gravity is within their boundaries. As long as the center of gravity is within the resting triangle or resting quadrangle, the machine will not tip. If, however, the center of gravity moves beyond one of the sides, the machine will tip.

As described above, the support foot may, for example, be stationary relative to the machine frame or may also be mounted on the machine frame such that it is height-adjustable between the stowed position and the ground contact position, for example via an actuator, in particular a hydraulic cylinder. The support foot therefore has either a fixed, specified support height or a variable support height. If the support foot is height-adjustable, its height adjustment is likewise controlled by the control unit, which sets, for example, a support height specified by the manufacturer or by the operator. The height adjustment itself may be achieved, for example, by configuring the support foot such that it is telescopic or pivotable. For example, it may comprise an actuator, in particular a hydraulic cylinder, at the lower end of which the resting surface of the support foot is arranged. Alternatively, it is also possible, for example, to mount the support foot on the machine frame by means of a pivot arm, which may in turn be pivoted by a hydraulic cylinder, for example. Overall, the support foot is thus adjustable between the stowed position and the ground contact position. The height adjustment of the support foot is, in particular, independent of the height adjustment of the milling drum box, for example the lateral shields and/or the stripping device, and/or the milling drum.

As described above, an aspect of the present invention is to ensure not only increased stability during the pivoting process but also that the ground itself is not damaged by supporting the road milling machine. For this purpose, it is provided in one embodiment that the support foot has the largest possible area of contact with the ground. The support foot may have a base plate for this purpose, the resting surface of the base plate being at least one fifth, preferably at least one quarter, more preferably at least one third and most preferably at least half of the resting surface of the pivotable travel unit. Whether the travel units are wheels or crawler tracks is irrelevant in this case. Due to the increased resting surface of the support foot, punctual loads on the ground are reduced and thus damage is reduced or avoided altogether.

Another measure to prevent damage to the ground is, in particular, to make at least that part of the support foot that comes into direct contact with the ground of a soft material. It is therefore preferred that the support foot, in particular the base plate, has a ground contact layer made of a rubber material or a plastic, for example polyurethane. This can be achieved, for example, if the support foot or the base plate are entirely made of these materials. Alternatively, the support foot and, in particular, the base plate may, for example, be made of a metal and may have a separate ground contact layer applied to the metal.

According to another aspect of the present invention of the road milling machine, the latter comprises a control unit configured to perform any of the methods described above. In this case, the entire pivoting process, in particular including an alignment of the road milling machine after pivoting in exactly the position in which the process was activated, is automatic. The operator only needs to activate a button or control element to issue a corresponding command to the control unit.

BRIEF DESCRIPTION OF THE DRAWINGS

The present invention will be described in more detail below by reference to the embodiment examples shown in the figures. In the schematic figures.

Like parts or parts acting in a same manner are designated by like reference numerals in the figures. Recurring parts are not designated separately in each figure.

DETAILED DESCRIPTION OF THE INVENTION

Figure 1:
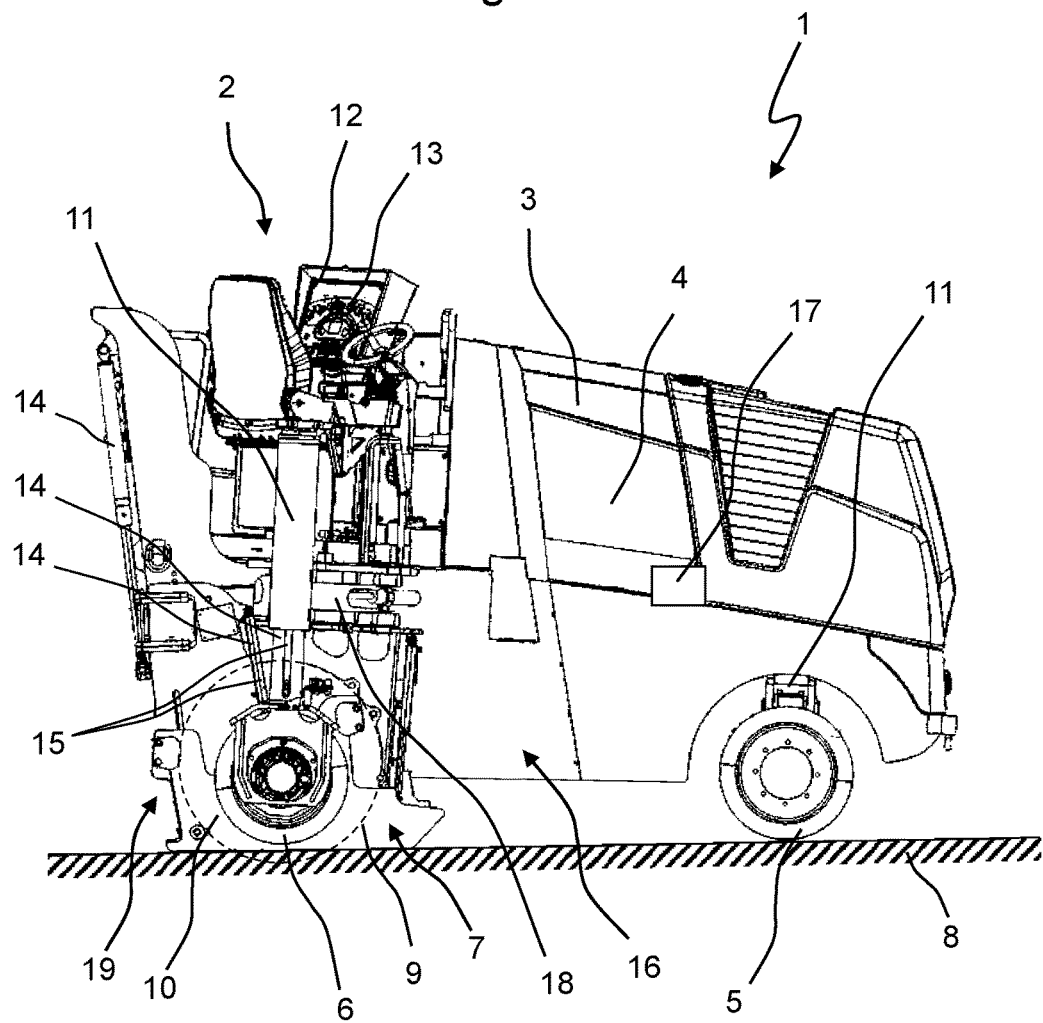
FIG. 1 is a side view of a road milling machine.

FIG. 1 shows a side view of a road milling machine 1, in particular a small or compact rear rotor type milling machine. The road milling machine 1 has an operator platform 2 and a machine frame 3 supported by a travel mechanism. The travel mechanism comprises at least one front travel unit 5 and one rear, pivotable travel unit 6. The travel units 5, 6 may be configured, for example, as wheels or also as crawler tracks. On the side of the machine opposite the rear, pivotable travel unit 6, which is not visible in FIG. 1, there is usually another travel unit 5. The road milling machine 1 is driven by a drive motor 4, which is usually an internal combustion engine, for example a diesel internal combustion engine. A milling drum box 7, in the interior of which a milling drum 9 is mounted for rotation, is arranged between the rear travel units 5, 6. During working operation, the road milling machine 1 moves forward in the working direction a, with the rotating milling drum 9 milling off the ground 8 using milling tools arranged on its outer circumferential surface.

To set the milling depth and to set the position of the milling drum 9 in relation to the ground 8, at least the rear travel units 5, 6, and in the example shown also the at least one front travel unit 5, are connected to the machine frame 3 via lifting columns 11. Each lifting column 11 comprises a hydraulic cylinder 14 and is height-adjustable via this hydraulic cylinder 14. The walls laterally closing the milling drum box 7 parallel to the working direction a are configured as lateral shields 10. The lateral shields 10 slide along the ground 8 and close off the milling drum box 7 transverse to the working direction a, so that no milled material thrown around by the milling drum 9 can endanger bystanders. To enable the lateral shields 10 to always rest on the ground 8 at different milling depths, the lateral shields 10 are likewise height-adjustable via hydraulic cylinders 14. The milling drum box 7 is closed off to the rear by a stripping device 19 which, for example, slides along the milling bed with its lower edge during operation and strips off any remaining milled material. The stripping device 19 is likewise height-adjustable via hydraulic cylinders 14.

The height adjustment of the travel units 5, 6, the lateral shields 10 and the stripping device 19 is controlled, for example, by a control unit 12, which, in particular, is part of the on-board computer of the road milling machine 1. The control unit 12 is thus in control connection with the hydraulic cylinders 14 and controls their extension state. For this purpose, the lifting columns 11 and also the hydraulic cylinders 14 have sensor devices configured as length sensors 15. The length sensors 15, for example draw-wire sensors, provide the control unit 12, in particular continuously, with measured values regarding the extension state of the lifting columns 11 and the hydraulic cylinders 14. Based on these measured values, the control unit 12 can control the respective extension state as desired and, if necessary, change or adjust it. Moreover, the control unit 12 has input means 13 accessible to the operator on the operator platform 2, via which the operator can enter control commands to the control unit 12. Finally, the control unit 12 is also connected to at least one inclination sensor 17, which determines, in particular continuously, the transverse and/or longitudinal inclination of the machine frame 3. These measured values can also be used by the control unit 12 to control the extension state of all lifting columns 11 and hydraulic cylinders 14, so that the control unit 12 can also control or adjust the transverse and/or longitudinal inclination of the machine frame 3.

Figure 2:
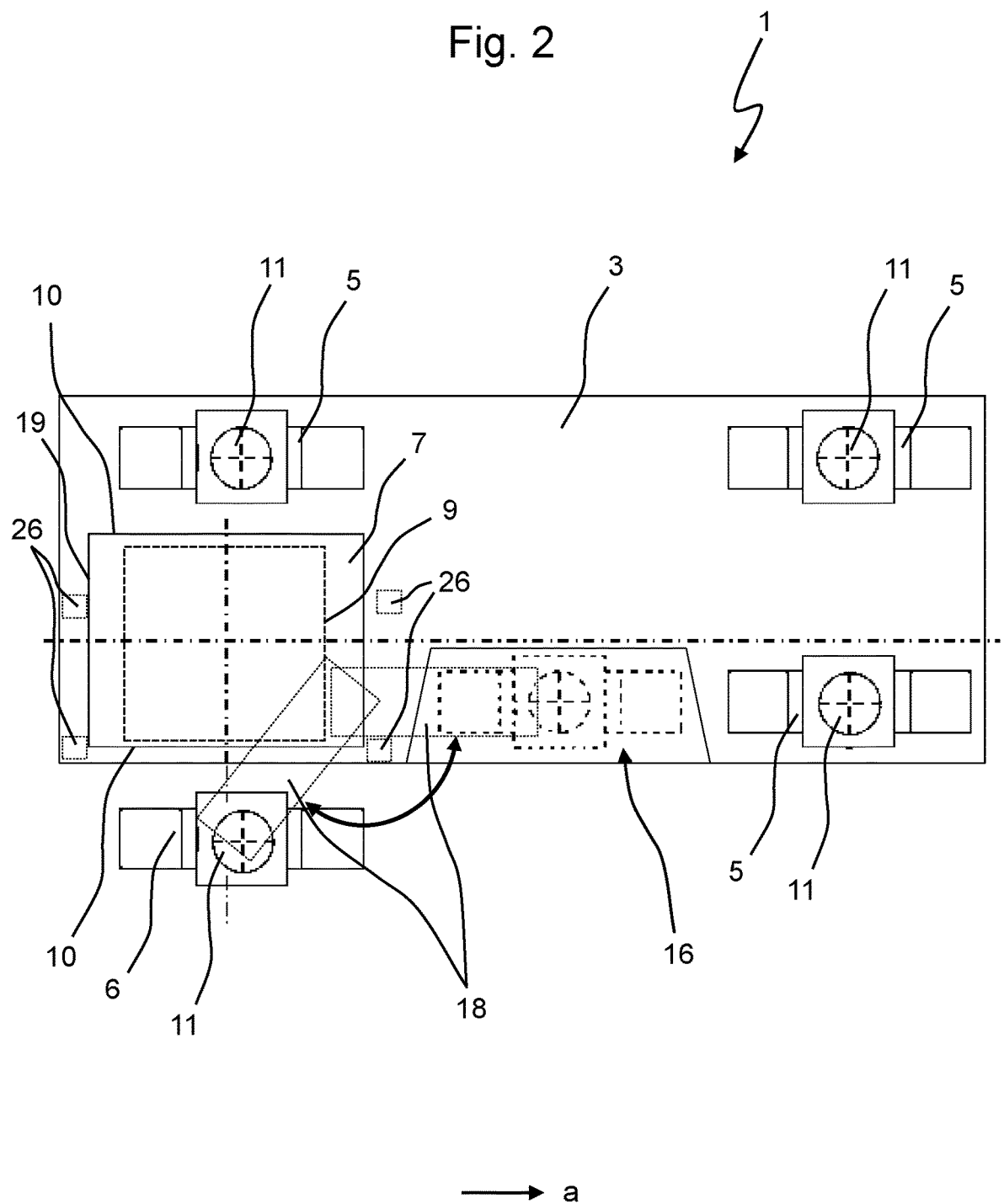
FIG. 2 is a top view of the machine frame and the travel mechanism of a road milling machine.

The pivoting of the travel unit 6 can be seen, in particular, in FIGS. 1 and 2. FIG. 2 is a top view of a kind of layout of the road milling machine 1. In particular, it can be seen that the road milling machine 1 in the embodiment example shown has a total of four travel units 5, 6, three travel units 5 being arranged on the machine frame 3 in a stationary manner, i.e., merely height-adjustable, and one travel unit 6 being pivotable. In particular, the travel unit 6 can be pivoted via a pivot arm 18 between an outer end position, in which it is shown with solid lines in FIG. 2, and an inner end position, in which it is shown with dashed lines in FIG. 2. In the outer end position, the travel unit 6 is outside the outer contour of the machine frame 3. In the inner end position, on the other hand, the travel unit 6 is arranged in a recess 16 of the machine frame 3 and does not protrude beyond the machine frame 3, in particular laterally transverse to the working direction a. With the travel unit 6 in the inner end position, the road milling machine 1 can therefore travel particularly close to an obstacle on the zero side, i.e., the side with the travel unit 6. As can also be seen from FIG. 2, the milling drum box 7 and the milling drum 9 are also arranged particularly close to this machine side, i.e., in the shown embodiment example the right side. Overall, it is therefore possible to mill particularly close to obstacles on the zero side while the travel unit 6 is in the inner end position. To enable the travel unit 6 to be pivoted via the pivot arm 18, the travel unit 6 is lifted off the ground 8 via its lifting column 11 so that it is no longer in contact with the ground 8. In this situation, the road milling machine 1 thus rests on one less travel unit 6 than in normal operation. This has a negative effect on the stability of the road milling machine 1, so that special precautions must be taken to pivot the travel device 6. To this end, four different possible mounting positions for a support foot 26 are shown as examples in FIG. 2. Generally, one support foot 26 is sufficient; however, several support feet 26 could be provided on the road milling machine 1. The support foot 26 is located at the right rear end of the machine frame 3 of the road milling machine 1, i.e., at the corner of the machine frame 3 where the travel device 6 is located. In a preferred embodiment of the present invention, the machine frame 3 can be lowered to such an extent that it is placed or supported on the ground 8 via the support foot 26, which increases stability. Moreover, the support foot 26 may also be mounted on the machine frame 3 by means of a hydraulic cylinder 14, so that the support foot 26 itself is height-adjustable relative to the machine frame 3. It is then adjustable relative to the machine frame 3 between a stowed position and a ground contact position. The support foot 26 may be provided in addition to or as an alternative to the other measures of the present invention.

Figure 3:
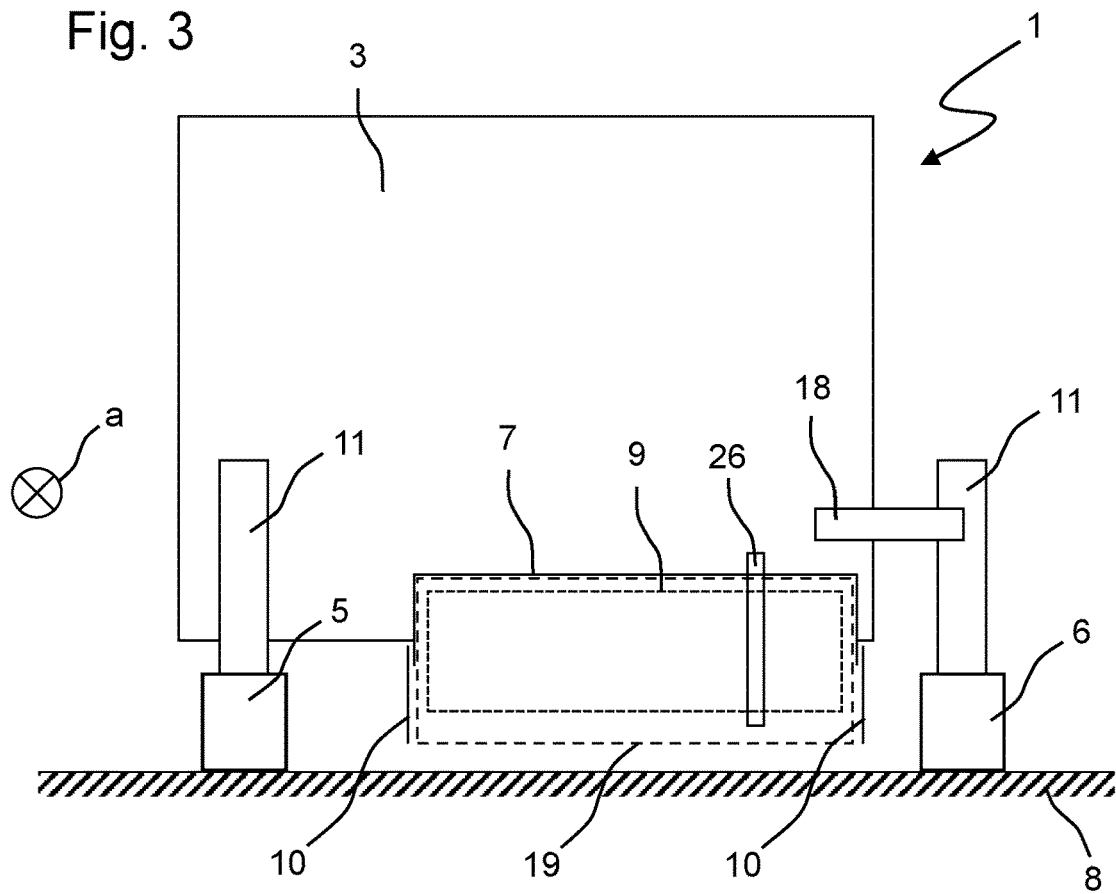
FIG. 3 is a view of the rear of the road milling machine in horizontal position.

A sequence of the method according to the present invention is described, for example, with reference to FIGS. 3 to 7. These each show a schematic rear view of the road milling machine 1, showing only the parts essential to understanding. For example, FIG. 3 shows a road milling machine 1 whose machine frame 3 is lifted to such an extent that the milling drum box 7 is not in contact with the ground, which refers to the lateral shields 10, the stripping device 19 and the milling drum 9. Moreover, a support foot 26 is formed on the machine frame 3, which is stationary in relation to it and also has no contact with the ground in the situation shown in FIG. 3. The pivotable travel unit 6 is in the outer end position. In the situation shown, the road milling machine 1 is already in a horizontal position with respect to its inclination, so that at least the inclination does not have to be corrected by this method sequence. During operation of the road milling machine 1, the situation shown in FIG. 3 occurs, for example, when the road milling machine 1 is about to be moved between two working positions and next has to mill closely along an obstacle. In this situation, the travel unit 6 needs to be pivoted to the inner end position. For this purpose, the operator issues a control command to the control unit 12, which starts the method according to the present invention. For this purpose, the control unit 12 obtains actual values from the inclination sensor 17 and the length sensors 15 of all hydraulic cylinders 14 of the lateral shields 10, the stripping device 19 and the lifting columns 11. The values determined are checked for deviation from the target range, based on which the control unit 12 calculates by what amount or by what adjustment travel the extension state of the lifting columns 11 needs to be adjusted. In one embodiment, the control unit 12 controls the method such that the inclination is first corrected and/or, if it is in the inclination target range, is also kept constant throughout the further sequence, at least with respect to a rear travel unit axis. The control unit 12 then controls the lifting columns 11 and causes the extension states to be adjusted accordingly.

Figure 4:
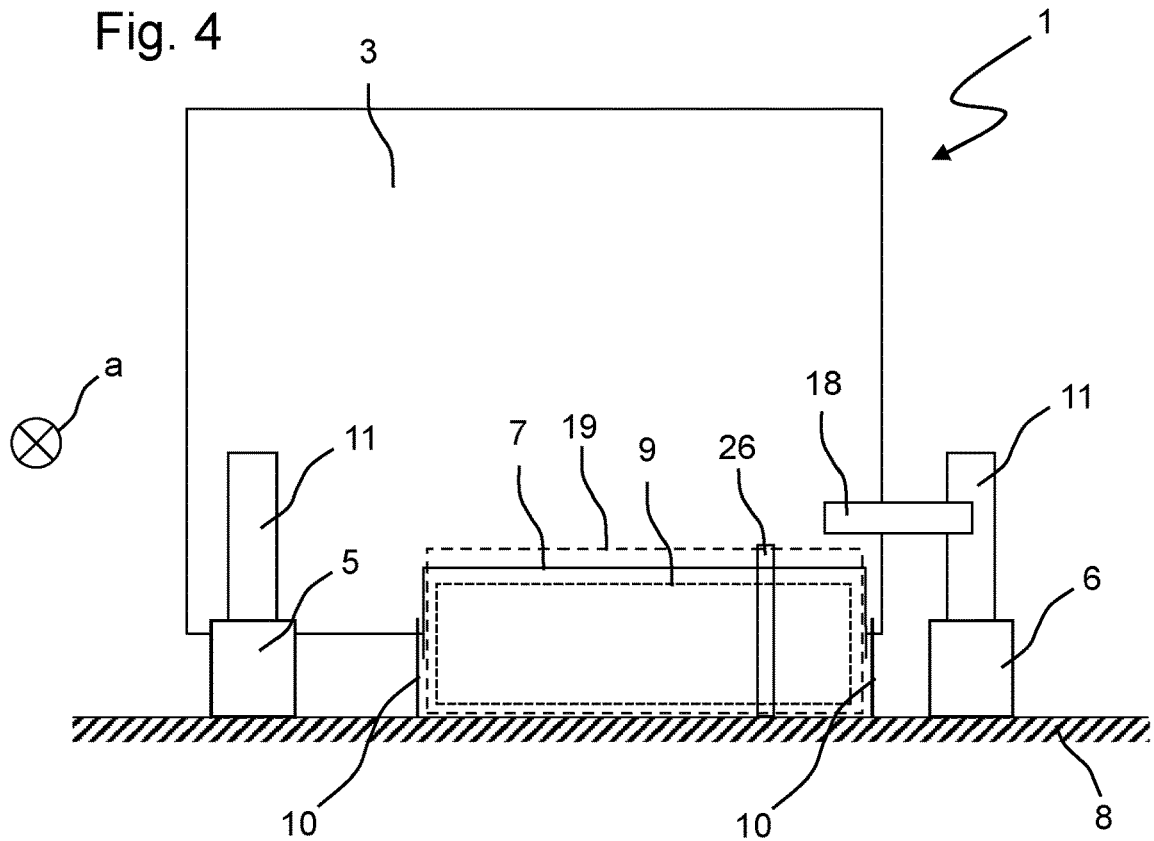
FIG. 4 is a view according to FIG. 3 with the machine frame supported on the milling drum box.
Figure 5:
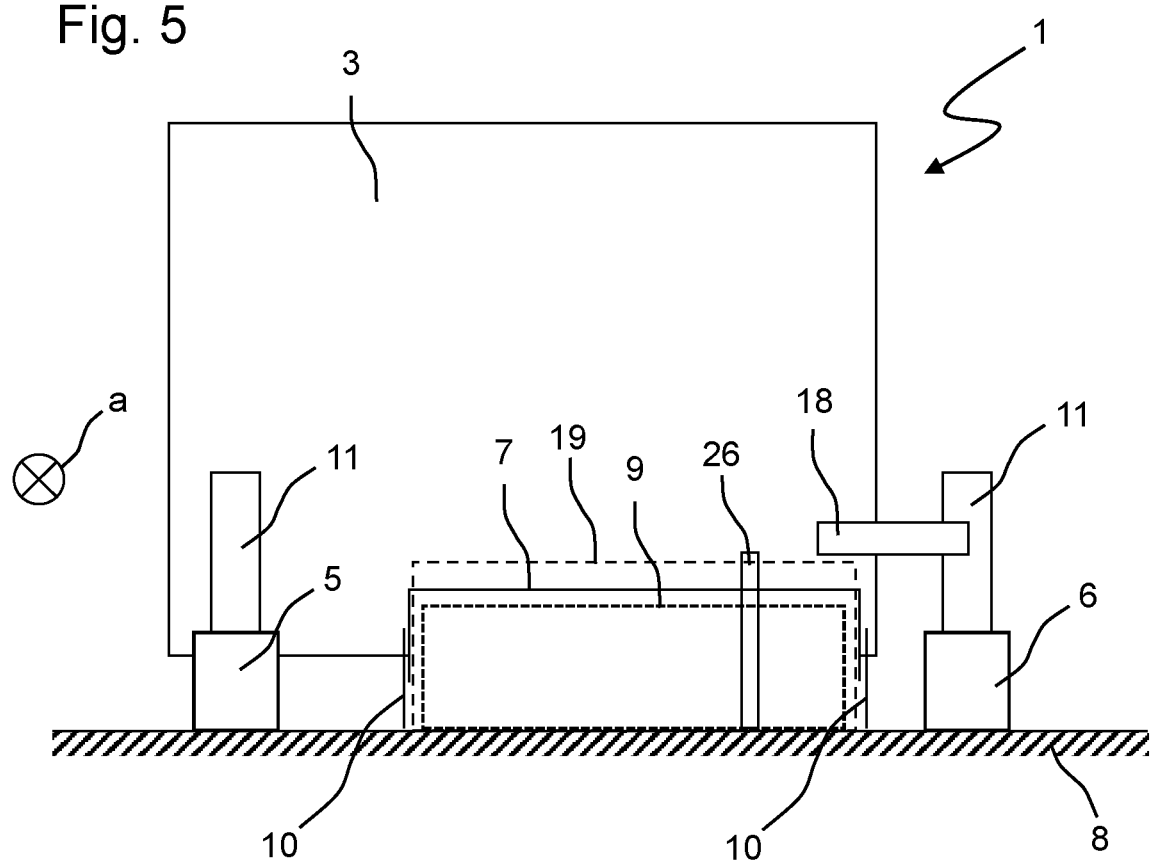
FIG. 5 is a view according to FIG. 3 with the machine frame supported on the milling drum box and the milling drum.

FIG. 4 shows the case in which the target range has been selected such that the lifting columns 11 are lowered to such an extent that both the support foot 26 and the milling drum box 7 rest on the ground 8 via the lateral shields 10 and the stripping device 19. Both lateral shields 10 and the stripping device 19 have already been pushed up by the ground 8 by a short distance, so that the lowering of the machine frame 3 has also already become detectable at the length sensor 15 of the hydraulic cylinders 14 of the lateral shields 10 and the stripping device 19. The milling drum 9 and its milling tools, on the other hand, are still spaced from the ground and do not rest on it. The center of gravity of the machine is significantly lower than in the previous situation shown in FIG. 3. FIG. 5 shows the case in which the target range has been selected such that the lifting columns 11 are lowered to such an extent that both the milling drum box 7, via the lateral shields 10 and the stripping device 19, and the milling drum 9 with its milling tools, as well as the support foot 26 rest on the ground 8. Compared to the situation in FIG. 4, the lateral shields 10 and the stripping device 19 have been pushed up from the ground by a further distance, so that the lowering of the machine frame 3 until the milling drum 9 is in contact with the ground can be detected not only by the length sensors 15 on the lifting columns 11 but also via the length sensor 15 of the hydraulic cylinders 14 of the lateral shields 10 and the stripping device 19. In addition to the additional support of the machine frame 3 via the milling drum 9, the center of gravity of the road milling machine 1 is lowered even further towards the ground 8, which contributes significantly to the stability of the road milling machine 1.

Both in the situation according to FIG. 4 and in the situation according to FIG. 5, the hydraulic cylinders 14 of the support foot 26, the lateral shields 10 and the stripping device 19 are now to be locked by blocking an inflow or outflow of hydraulic fluid to or from the hydraulic cylinders 14 via locking valves. The lateral shields 10 and the stripping device 19 as well as the support foot 26 are therefore no longer height-adjustable and can therefore contribute much better to supporting the machine frame 3 on the ground 8.

Figure 6:
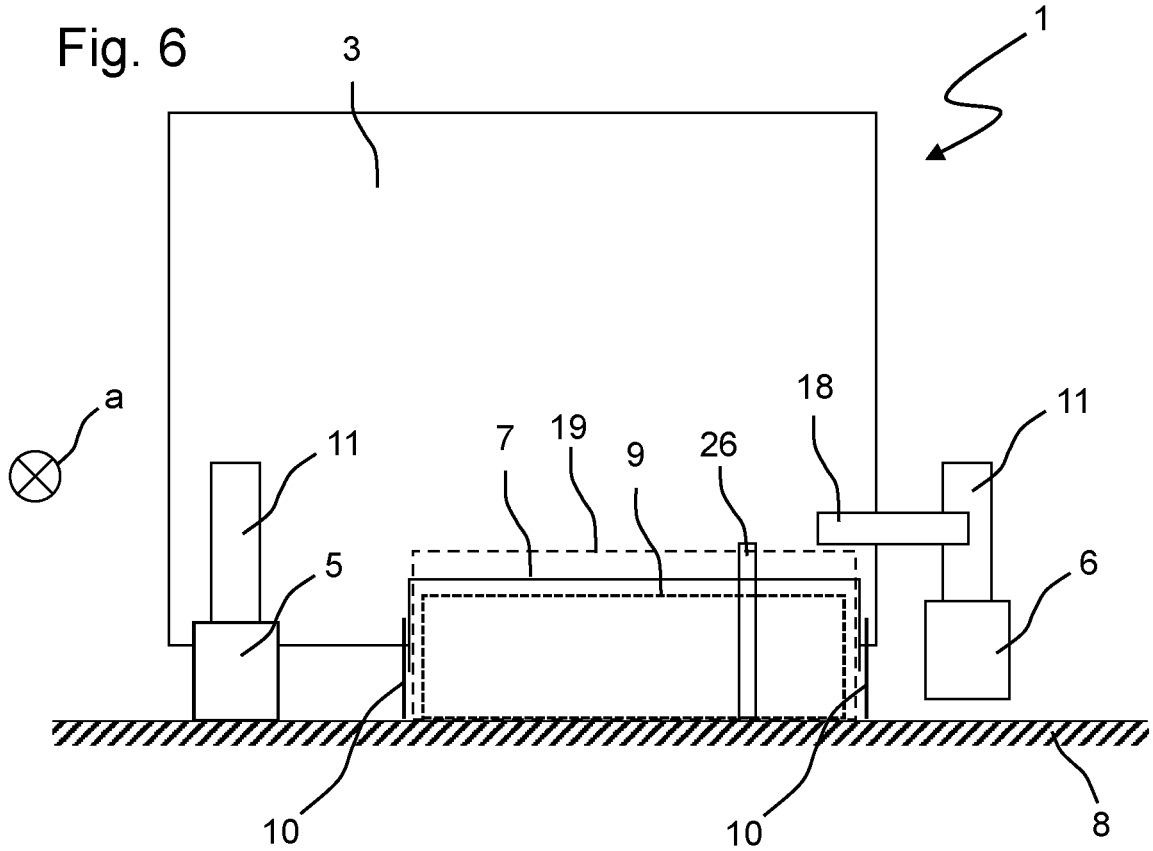
FIG. 6 is a view according to FIG. 5 during the pivoting of a travel unit.
Figure 7:
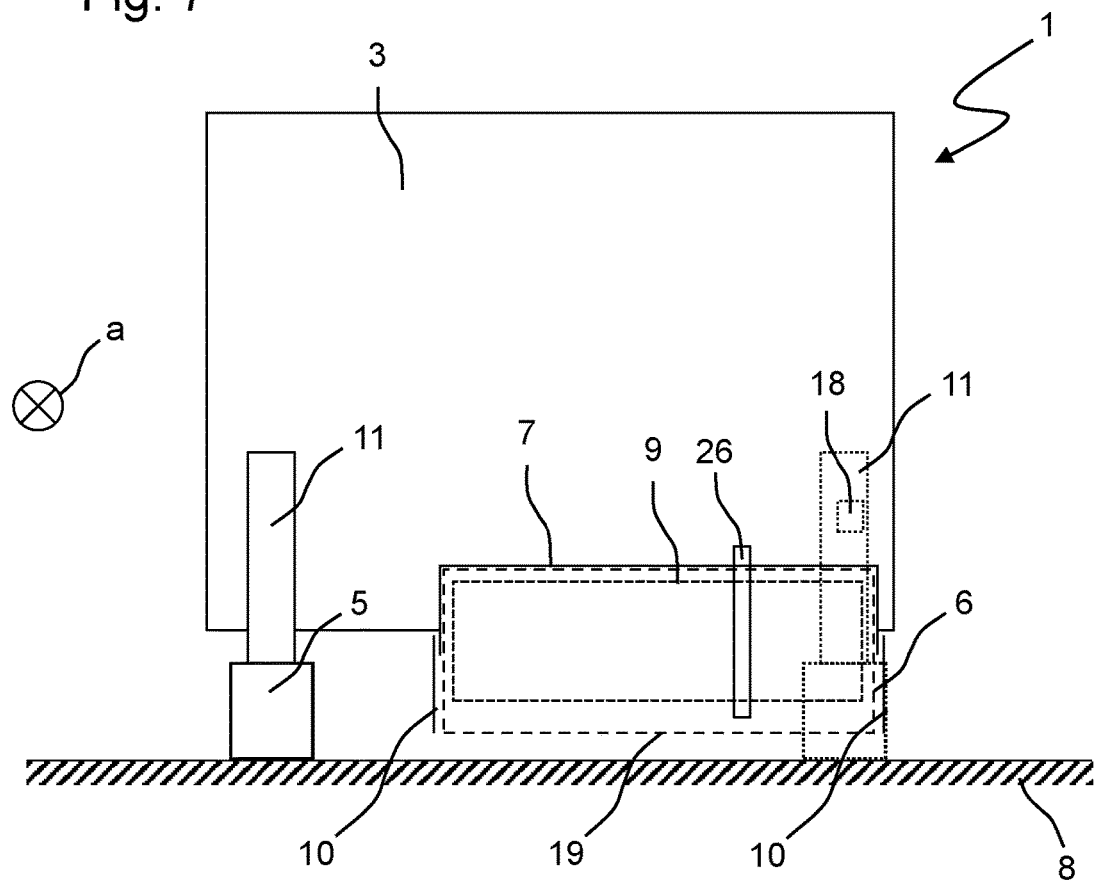
FIG. 7 is a view according to FIG. 3 with pivoted travel unit.

Using the case with the milling drum 9 supported on the ground 8 as an example, FIG. 6 shows that the next step performed is pivoting the travel unit 6 between the outer end position and the inner end position. In particular, FIG. 6 shows that the travel unit 6 is lifted off the ground 8 via the lifting column 11 to allow pivoting into the inner end position. In this situation, the travel unit 6 can no longer contribute to the stability of the road milling machine 1. On the contrary, due to its position extending away from the machine frame 3, the travel unit 6 even acts toward tipping of the machine due to the leverage effect of its weight, which is compensated for by the increased stability according to the present invention provided by the position of the machine, for example also by supporting it on the milling drum box 7 and/or the milling drum 9 and/or the support foot 26. Next, the actual pivoting movement of the travel unit 6 to the inner end position is carried out. The travel unit 6 is then lowered back to the ground 8, so that the road milling machine 1 rests on all travel units 5, 6 again. The control unit 12 then controls the lifting columns 11 to restore the actual value of the position parameter as determined at the beginning of the method. This means that all lifting columns 11 are returned to their original positions or original extension states. If the support foot 26 was moved from a stowed position to the ground contact position by a height adjustment relative to the machine frame 3, this movement is now also reversed. This situation, in which the method according to the present invention ends, is illustrated, for example, for the embodiment example shown in FIG. 7. The road milling machine 1 can now be moved very close to an obstacle on the machine side of the pivotable travel unit 6 and can also mill very close to this obstacle. Of course, the method according to the present invention also comprises the reverse process, in which the travel unit 6 is pivoted from the inner end position to the outer end position.

Figure 8:
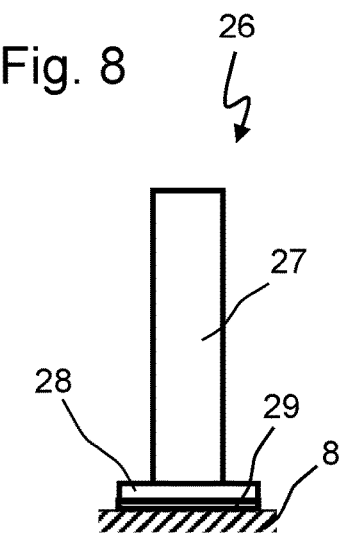
FIG. 8 is a detailed view of an embodiment of a support foot.
Figure 9:
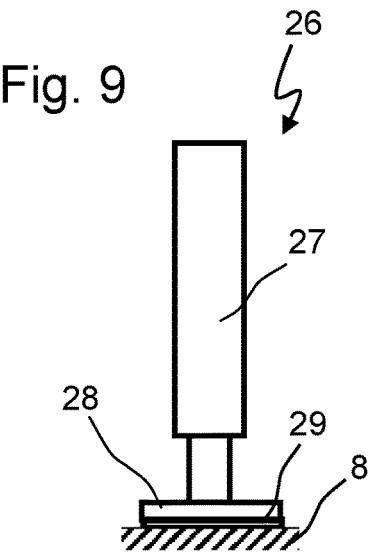
FIG. 9 is another detailed view of an embodiment of a support foot.
Figure 10:
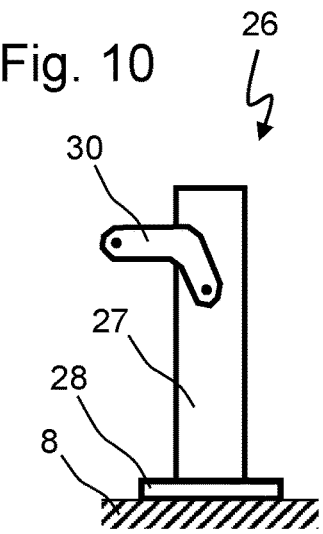
FIG. 10 is another detailed view of an embodiment of a support foot.

FIGS. 8 to 10 show examples of different embodiments of the support foot 26. FIG. 8 shows a support foot 26, which is preferably arranged on the machine frame 3 in a stationary manner. It comprises a support bar 27 arranged essentially vertically and a base plate 28 arranged at the vertically lower end of the support foot 26. The base plate 28 may have a round or also an angular basic shape and is flat in the horizontal plane, in particular parallel to the ground 8, thus forming the largest possible resting surface of the support foot. In the embodiment shown, both the support bar 27 and the base plate 28 of the support foot 26 are made of a metal. To prevent damage to the ground 8, the base plate 28 is equipped with a ground contact layer 29 on the bottom side. The bottom contact layer 29 is formed of a softer material, for example plastic, in particular polyurethane, or rubber. The base plate 28 may also be articulated to the support bar 27, so that the base plate 28 can adapt to unevenness of the ground 8 and rests on it with a maximum possible share of its surface. In this case, the ground contact layer 29 also increases the slip resistance of the support foot 26 on the ground 8.

FIG. 9 shows a telescopic embodiment of the support foot 26. In particular, the support bar 27 is configured as a hydraulic cylinder. The base plate 28 of the support foot 26 is arranged at the lower end of the piston of the hydraulic cylinder of the support bar 27. A reverse arrangement, in which the base plate 28 is arranged on the cylinder, would also be possible. By retracting or extending the hydraulic cylinder, the support foot 26 and, in particular, the base plate 28 with the ground contact layer 29 of the support foot 26 are height-adjustable relative to the machine frame 3, in particular between the stowed position and the ground contact position.

FIG. 10 shows another embodiment in which the support foot 26 is height-adjustable relative to the machine frame 3. The support foot again comprises a support bar 27 and a base plate 28. In the embodiment example shown, the base plate 28 is made directly from a plastic, such as polyurethane. A separate ground contact layer 29 was therefore dispensed with here. The height adjustability of the support foot 26 is realized by the fact that the support bar 27 is mounted on the machine frame 3 via a pivoted lever 30. The pivoted lever 30 can be pivoted via a hydraulic cylinder (not shown), wherein this pivoting movement results in an adjustment or pivoting of the support foot 26 between the stowed position and the ground contact position.

Figure 11:
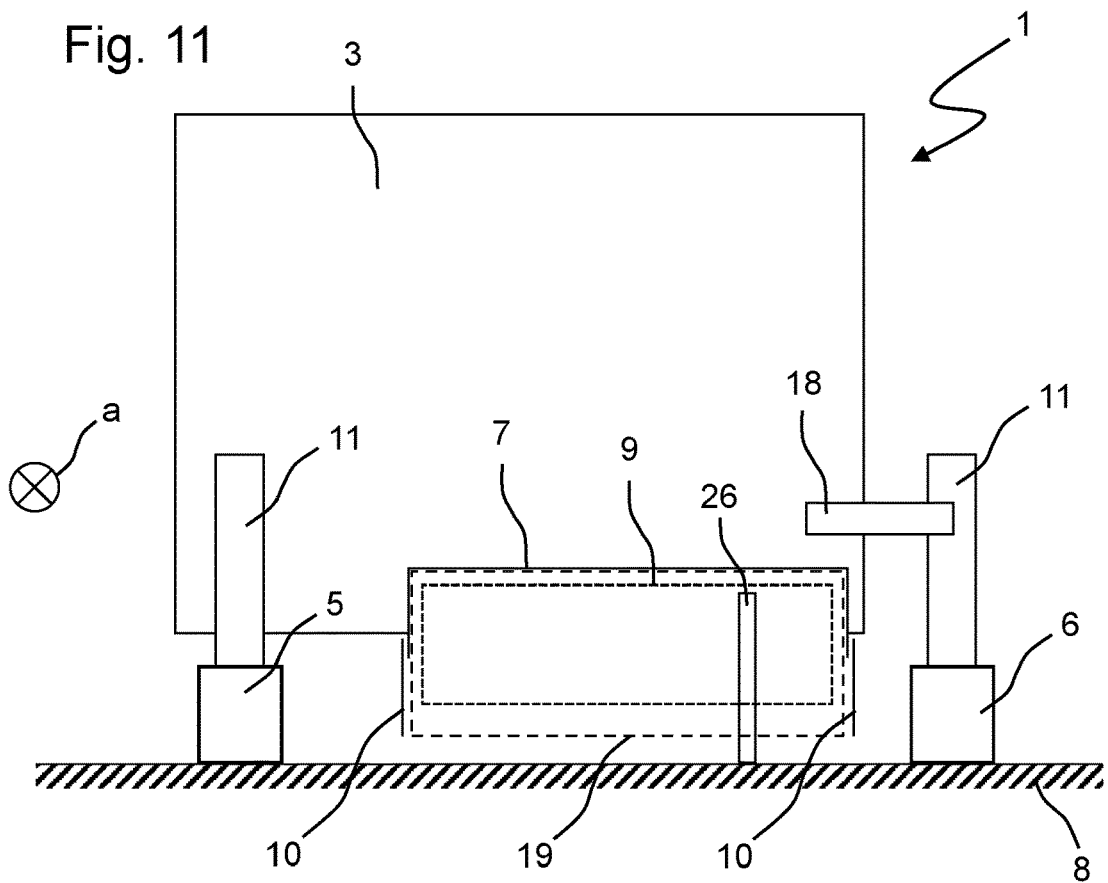
FIG. 11 is a view according to FIG. 3 with height-adjustable support foot in ground contact position.
Figure 12:
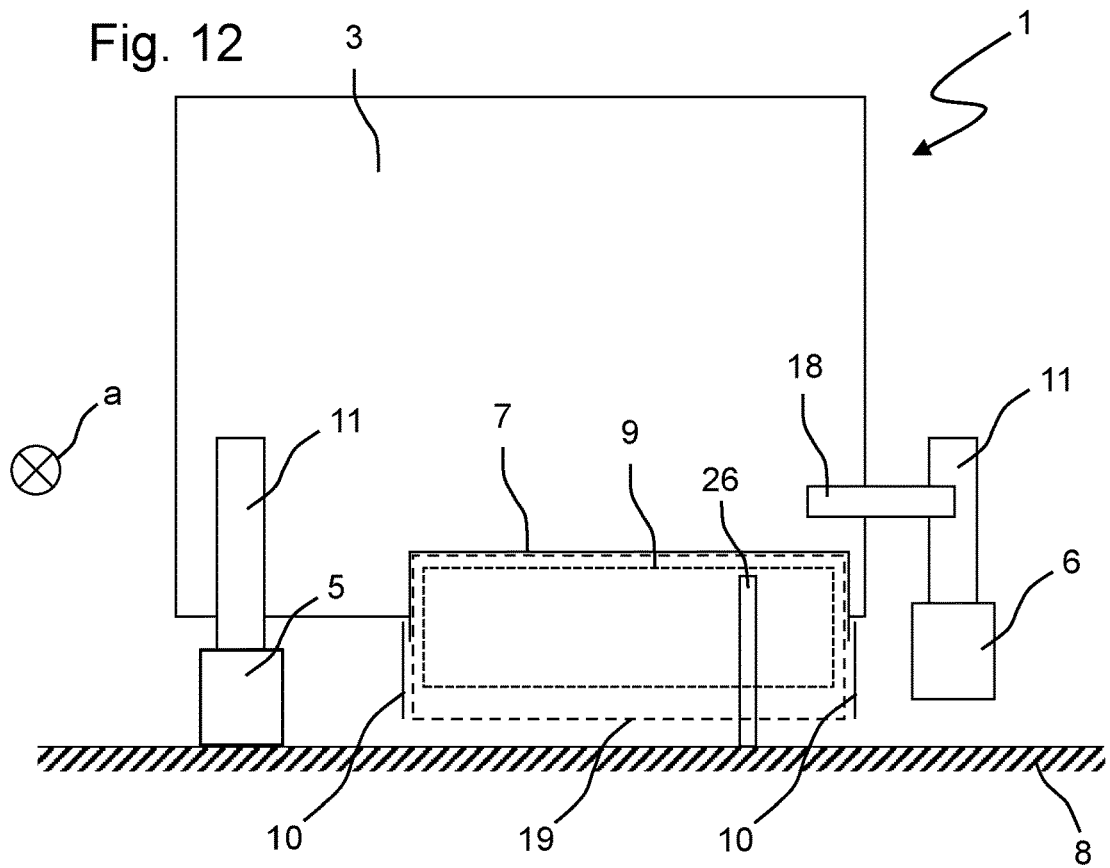
FIG. 12 is a view according to FIG. 11 during the pivoting of a travel unit.

FIGS. 11 and 12 correspond to the views according to FIGS. 4, and 5 and 6, respectively, but refer to an embodiment with a support foot 26 that is height-adjustable relative to the machine frame 3. FIG. 11 shows the situation in which the height-adjustable support foot 26 has already been brought into the ground contact position by a height adjustment. The support foot 26 thus rests on the ground 8 and supports the road milling machine 1 or its machine frame 3 on the ground 8. The support is in this case provided exclusively by the support foot 26. In particular, neither the milling drum box 7 with its lateral shields 10 and the stripping device 19 nor the milling drum 9 with its milling tools are in contact with the ground 8, but are spaced from the latter. FIG. 12 then again shows the situation during pivoting of the travel unit 6. The travel unit 6 has been moved out of contact with the ground 8 by lifting, as a result of which a considerable portion of the weight of the road milling machine 1, which can no longer be borne by the travel unit 6, now rests on the support foot 26. In this manner, the travel unit 6 can be safely pivoted without the road milling machine 1 tipping.

Figure 13:
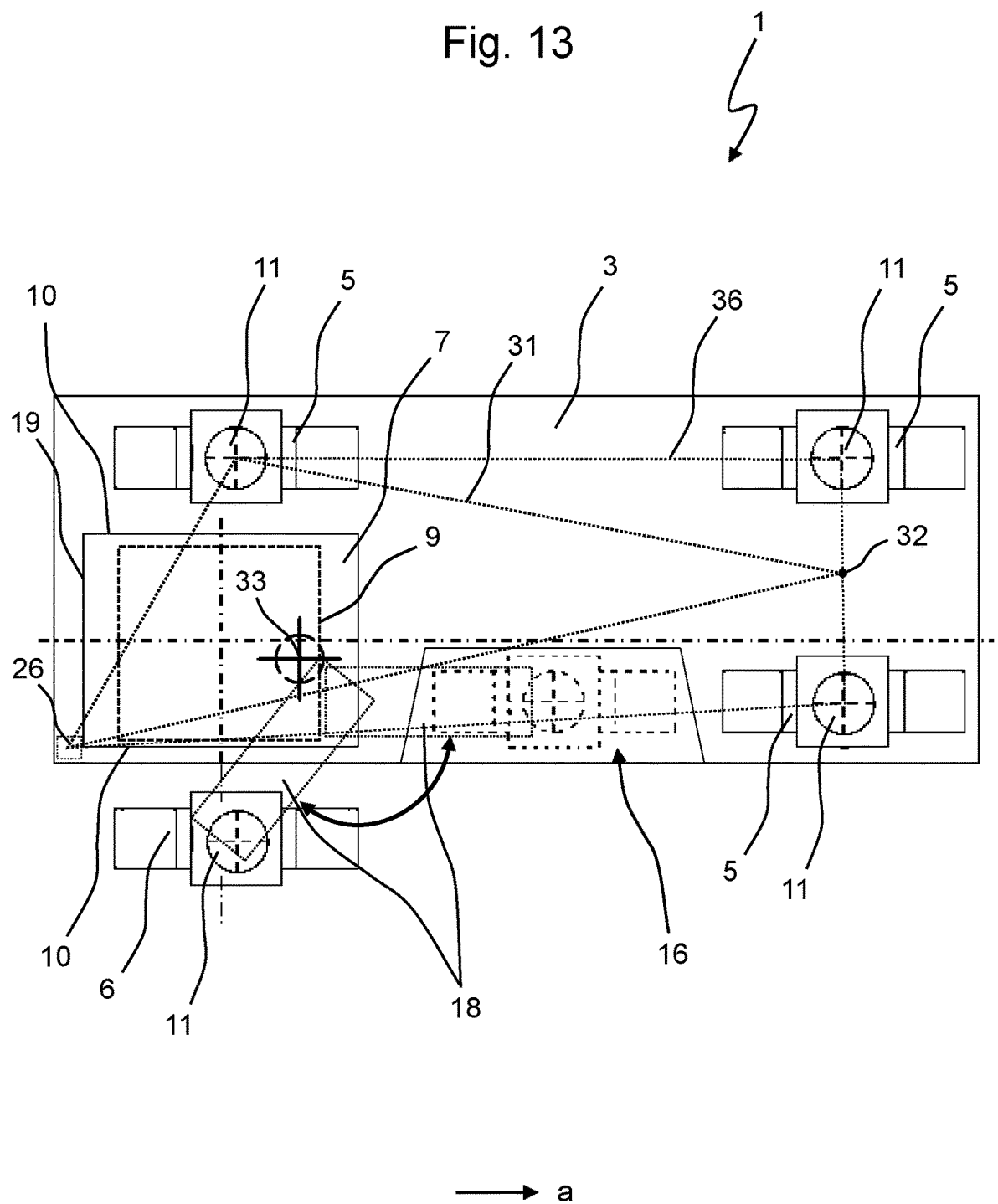
FIG. 13 is a view according to FIG. 2 illustrating the positioning of the support foot.

FIG. 13 illustrates the effect of the support foot 26 on the stability of the road milling machine 1, in particular in the case where the road milling machine 1 is supported on the ground 8 exclusively via the support foot 26, of course in cooperation with the non-pivotable travel units 5. The center of gravity 33 of the road milling machine 1 is located in the rear and, in particular, is offset laterally off-center toward the pivotable travel unit 6. During the pivoting process, the road milling machine 1 is in contact with the ground only via the non-pivotable travel units 5 and the support foot 26. If the road milling machine 1 has a total of four travel units 5, 6, it comprises two front travel units 5, as shown in the figure. All in all, during the pivoting process, the road milling machine 1 then rests on the ground 8 with the two front travel units 5 as well as the non-pivotable rear travel unit 5 and the support foot 26. These four resting points together form a resting quadrangle 36. As can be seen from FIG. 13, the support foot 26, in particular, is arranged on the machine frame 3 such that the center of gravity 33 of the road milling machine 1 lies within the resting quadrangle 36. Generic road milling machines 1 are often equipped with a swing axle at their front travel units 5. In this case, the travel units 5 do not each form individual points of contact, but rather the pendulum point 32 located in the middle between the two travel units 5 must be used for questions of tipping resistance. A single front travel unit 5 may also be arranged at this position in cases in which the road milling machine 1 has a total of three travel units 5, 6. In both cases, the single front travel unit 5 or the pendulum point 32 together with the non-pivotable rear travel unit 5 and the support foot 26 form a resting triangle 31. However, due to the positioning of the support foot 26, the center of gravity 33 of the road milling machine 1 also lies within this resting triangle 31, so that in this configuration of the road milling machine 1 as well, tipping of the machine during the pivoting process of the pivotable travel unit 6 is reliably avoided.

Figure 14:
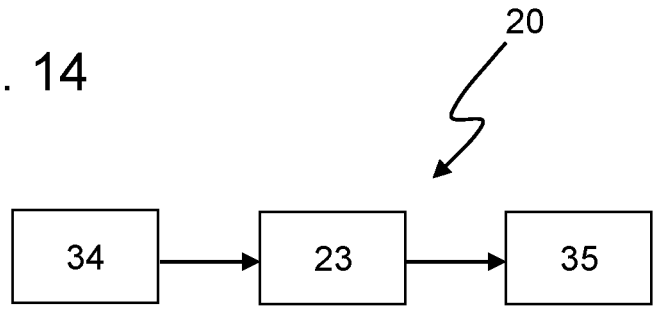
FIG. 14 is a flow chart of the method.

FIG. 14 illustrates a flow chart of the method 20 according to the present invention. The method 20 begins with positioning 34 the support foot 26 mounted on the machine frame 3 in the ground contact position to support the machine frame 3 on the ground. Said positioning 34 thus comprises, in particular, for example, lowering the machine frame 3 as a whole including the support foot 26 and/or a height adjustment of the support foot 26 with respect to the machine frame 3. Next, the travel unit 6 is pivoted 23 between the outer end position and the inner end position, wherein said pivoting 23 is naturally preceded by lifting the travel unit 6 and followed by lowering the travel unit 6. Finally, the support foot 26 is repositioned 35 in the stowed position, for example again by lifting the machine frame 3 as a whole including the support foot 26 and/or by adjusting a height of the support foot 26 with respect to the machine frame 3. The method 20 shown in FIG. 14 may, for example, be carried out entirely by the operator of the road milling machine, who issues corresponding control commands for this purpose.

Figure 15:
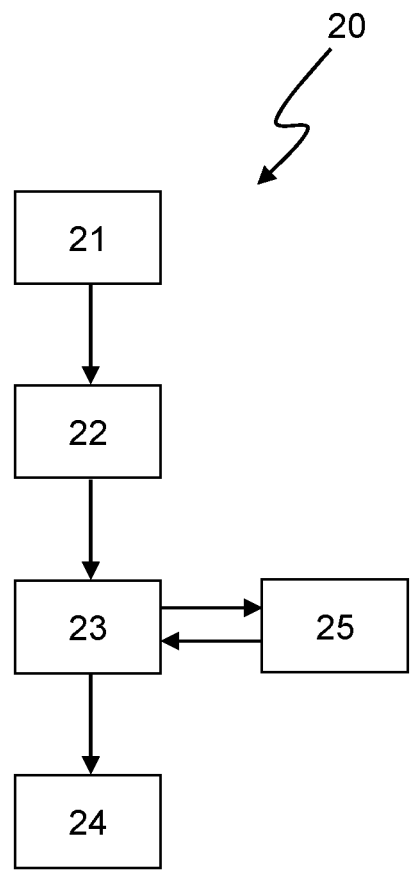
FIG. 15 is a flowchart of the method performed by a control unit.

FIG. 15 shows a flow chart of the further method 20 according to the present invention. The method 20 according to FIG. 15 is carried out automatically by a control unit 12 upon request by the operator. It starts with determining 21 the actual value of the at least one position parameter. This may comprise, for example, an inclination of the machine frame 3 or the extension states of the lifting columns 11 and/or the hydraulic cylinders 14 of the lateral shields 10 and the stripping device 19. These values are queried by the control unit 12 and stored at the same time. The control unit 12 determines differences between the measured values and a specified target range. Next, the method comprises adjusting 22 the at least one position parameter to the target range. For this purpose, the control unit 12 controls, in particular, the lifting columns 11 of the travel units 5, 6. By changing the extension states of the lifting columns 11, both the inclination of the machine frame 3 and its height position with respect to the ground 8 can be adjusted, so that the stability of the road milling machine 1 is increased. Depending on how the target range was determined, said adjusting 22 may also comprise supporting the machine frame 3 on the ground 8 via the milling drum box 7 or its lateral shields 10 and/or the stripping device 19 and/or via the milling drum 9 and/or via the support foot 26. Next, the control unit 12 controls a pivoting 23 of the travel unit 6 between the outer end position and the inner end position. Said pivoting 23 also includes, of course, lifting and subsequently lowering the travel unit 6. Once the pivoting 23 is completed, it is followed by restoring 24 the actual value of the at least one position parameter and, in particular, all position parameters used in the method 20, for example all extension states of the height-adjustable lifting columns 11. In addition, the method 20 comprises monitoring 25 the position parameters, in particular the transverse and/or longitudinal inclination of the machine frame 3, and, in particular, during the pivoting 23 of the travel unit 6. For monitoring 25, the control unit 12 queries the position parameters from the sensor devices at regular intervals or continuously. If a critical deviation from the target range is detected, the control unit 12 aborts the pivoting 23 and, in particular, the entire method 20 and immediately attempts to restore the initial position at the beginning of the method 20. Therefore, even if the road milling machine 1 starts to tip during the method 20 despite the precautions according to the present invention, countermeasures are automatically and immediately initiated.

The method according to the present invention allows a fast and efficient pivoting of the travel unit 6 between the outer end position and the inner end position. Tipping of the machine can be reliably avoided. At the same time, damage to the machine, for example due to the machine frame 3 being lowered too quickly for support on the milling drum box 7 and/or the milling drum 9 and/or the support foot 26, is avoided. Likewise, damage to the ground 8, for example sealings of bridges, is avoided. Last but not least, this also relieves the operator of the road milling machine 1, who no longer has to handle the details of the pivoting process, but merely requests pivoting at the control unit 12, which then automatically carries out the method according to the present invention, taking into account parameters that would not have been available to the operator alone. Overall, therefore, the present invention contributes to the operational safety of the road milling machine 1.

What is claimed is:

1. A method for pivoting a travel unit on a machine frame of a road milling machine between an outer end position and an inner end position offset toward a center of the machine with respect to the outer end position, the road milling machine having a travel mechanism with multiple travel units, of which at least one travel unit is height-adjustable via a lifting column, the method comprising the steps of:
   a) positioning a support foot mounted on the machine frame in a ground contact position to support the machine frame;
   b) lifting the travel unit, pivoting the travel unit between the outer end position and the inner end position, lowering the travel unit; and
   c) positioning the support foot in a stowed position.

2. The method according to claim 1,
   wherein said positioning in the ground contact position comprises lowering the machine frame until the support foot is in the ground contact position, and/or adjusting a height of the support foot relative to the machine frame from a stowed position into the ground contact position, and/or
   said positioning in the stowed position comprises lifting the machine frame until the support foot is in the stowed position and/or adjusting a height of the support foot relative to the machine frame from the ground contact position into the stowed position.

3. The method according to claim 1,
   wherein the method is carried out automatically by a control unit upon request by an operator and additionally comprises the following steps:
   a) determining an actual value of at least one position parameter of the machine frame via a sensor device;
   b) adjusting the at least one position parameter of the machine frame via control of the at least one lifting column until reaching a target range such that the machine frame has a stable position in order to avoid tipping during the pivoting of the travel unit; and
   c) restoring the previously determined actual value of the at least one position parameter of the machine frame via control of the at least one lifting column.

4. The method according to claim 3,
   wherein the at least one position parameter is a transverse and/or longitudinal inclination of the machine frame and the target range does not deviate by more than 15° from a horizontal position.

5. The method according to claim 3,
   wherein the sensor device comprises at least one inclination sensor.

6. The method according to claim 3,
   wherein the at least one position parameter is a distance reflecting an extension state of at least one hydraulic cylinder.

7. The method according to claim 3,
   wherein the sensor device comprises at least one length sensor on at least one lateral shield and/or on a stripping device and/or on the at least one lifting column.

8. The method according to claim 3,
   wherein adjusting the at least one position parameter of the machine frame comprises supporting the machine frame on the ground, by supporting the machine frame on the milling drum box, and/or on the lateral shields and/or on the stripping device, and/or on the milling drum and/or on the support foot.

9. The method according to claim 8,
   wherein hydraulic cylinders provided for height adjustment of the lateral shields and/or the stripping device and/or the support foot are locked during said supporting of the machine frame on the ground.

10. The method according to claim 8,
    wherein the operator specifies via an input means that supporting of the machine frame on the ground is carried out by supporting the machine frame on the milling drum box, and/or on the lateral shields and/or on the stripping device, and/or on the milling drum and/or on the support foot.

11. The method according to claim 3,
    wherein the control unit detects the current value of the at least one position parameter of the machine frame multiple times, and that the control unit aborts the pivoting of the travel unit if, after pivoting has begun, the control unit detects a value which deviates from the target range by a specified threshold value.

12. The method according to claim 11,
    wherein the control unit detects the current value of the at least one position parameter of the machine frame continuously.

13. The method according to claim 8,
    wherein the control unit detects the extension state of the lateral shields and/or of the stripping device and/or of the support foot and/or the hydraulic pressure in the hydraulic cylinders of the lateral shields and/or of the stripping device and/or of the support foot, and that the control unit aborts the pivoting of the travel unit if, after pivoting has begun, the control unit detects a value that deviates from the target range by a specified threshold value.

14. The method according to claim 3,
    wherein the control unit carries out the method as long as the operator keeps an input means activated, and that the control unit aborts the method if the operator releases the input means before the method is completed.

15. The method according to claim 3,
    wherein the at least one position parameter is a transverse and/or longitudinal inclination of the machine frame and the target range does not deviate by more than 10° from a horizontal position.

16. The method according to claim 3,
    wherein the at least one position parameter is a transverse and/or longitudinal inclination of the machine frame and the target range does not deviate by more than 5° from a horizontal position.

17. A road milling machine for milling off a ground, comprising:
    a drive motor;
    an operator platform;
    a machine frame supported by pivotable and non-pivotable travel units, wherein at least one travel unit is height-adjustable via a lifting column and is pivotable around a vertical swivel axis between an outer end position and an inner end position offset toward a center of the machine relative to the outer end position; and
    a milling drum mounted for rotation in a milling drum box,
    wherein a support foot is provided, which is configured to support, in a ground contact position, the machine frame on the ground during the pivoting of the pivotable travel unit.

18. The road milling machine according to claim 17,
    wherein the support foot, in the ground contact position, together with the non-pivotable travel units, spans a resting triangle or resting quadrangle, the support foot being positioned such that a center of gravity of the road milling machine is arranged within the resting triangle or resting quadrangle.

19. The road milling machine according to claim 18, wherein the base plate of the support foot has a ground contact layer made of a rubber material or a plastic.

20. The road milling machine according to claim 19, wherein the plastic is polyurethane.

21. The road milling machine according to claim 17, wherein the support foot is height-adjustable, in particular telescopic or pivotable, relative to the machine frame between a stowed position and the ground contact position.

22. The road milling machine according to claim 17, wherein the support foot has a base plate, a resting surface of the base plate being at least one fifth of a resting surface of the pivotable travel unit.

23. The road milling machine according to claim 17, wherein the road milling machine has a control unit configured to carry out a method comprising the steps of:
a) positioning a support foot mounted on the machine frame in a ground contact position to support the machine frame;
b) lifting the travel unit, pivoting the travel unit between the outer end position and the inner end position, lowering the travel unit; and
c) positioning the support foot in a stowed position.

\* \* \* \* \*